(12) United States Patent
Good (10) Patent No.: US 8,799,766 B2
(45) Date of Patent: Aug. 5, 2014

(54) INTERACTIVE CONTROL OF DOCUMENT UPDATES (75) Inventor: Charles Good, Cincinnati, OH (US)

(73) Assignee: Adobe Systems Incorporated, San Jose, CA (US)

( * ) Notice: Subject to any disclaimer, the term of this patent is extended or adjusted under 35 U.S.C. 154(b) by 2198 days.

(21) Appl. No.: 11/242,808

(22) Filed: Oct. 3, 2005

(65) Prior Publication Data
US 2014/0013209 A1 Jan. 9, 2014

(51) Int. Cl.
G06F 17/00 (2006.01)

(52) U.S. Cl.
USPC .......................................... 715/234; 715/231

(58) Field of Classification Search
USPC .................. 715/234, 237, 255, 277, 230–231
See application file for complete search history.

(56) References Cited

U.S. PATENT DOCUMENTS

| | | | | |
|---|---|---|---|---|
| 5,220,657 A * | 6/1993 | Bly et al. | ...................... | 711/152 |
| 5,890,177 A * | 3/1999 | Moody et al. | .................. | 715/210 |
| 6,360,250 B1 * | 3/2002 | Anupam et al. | ............... | 709/204 |
| 6,529,905 B1 * | 3/2003 | Bray et al. | .............. | 1/1 |
| 6,584,466 B1 * | 6/2003 | Serbinis et al. | ................. | 707/10 |
| 6,996,781 B1 * | 2/2006 | Myers et al. | ................... | 715/763 |
| 7,062,532 B1 * | 6/2006 | Sweat et al. | ................... | 709/205 |
| 7,069,592 B2 * | 6/2006 | Porcari | ........................... | 726/26 |
| 7,080,083 B2 * | 7/2006 | Kim et al. | .............. | 1/1 |
| 7,107,518 B2 * | 9/2006 | Ramaley et al. | ............... | 715/235 |
| 7,152,204 B2 * | 12/2006 | Upton | ........................... | 715/239 |
| 7,155,662 B1 * | 12/2006 | Edwards et al. | ............... | 715/229 |
| 7,191,394 B1 * | 3/2007 | Ardeleanu et al. | ............ | 715/241 |
| 7,299,408 B1 * | 11/2007 | Daconta et al. | ............... | 715/234 |
| 7,299,502 B2 * | 11/2007 | Schmeling et al. | ............. | 726/29 |
| 7,315,857 B2 * | 1/2008 | Dettinger et al. | ................. | 707/6 |
| 7,325,193 B2 * | 1/2008 | Edd et al. | ....................... | 715/255 |
| 7,496,841 B2 * | 2/2009 | Hadfield et al. | ............... | 715/255 |
| 7,505,994 B2 * | 3/2009 | Ahmed et al. | ......................... | 1/1 |
| 7,516,145 B2 * | 4/2009 | Sikchi et al. | .................... | 707/102 |
| 7,788,237 B2 * | 8/2010 | Voronov et al. | ............... | 707/695 |
| 2006/0026502 A1 * | 2/2006 | Dutta | ........................... | 715/511 |
| 2006/0117247 A1 * | 6/2006 | Fite et al. | ....................... | 715/511 |
| 2006/0277452 A1 * | 12/2006 | Villaron et al. | ............... | 715/500 |

OTHER PUBLICATIONS

U.S. Appl. No. 11/100,667, Charles Good.

* cited by examiner

Primary Examiner — Manglesh M Patel
(74) Attorney, Agent, or Firm — Kilpatrick Townsend & Stockton LLC (57) ABSTRACT Processing changes to a document is disclosed. An indication that changes, if any, affecting the document or a portion thereof are to be reviewed is received. The document comprises one or more segments each of which is configured to be generated automatically based at least in part on data from a data source associated with the segment. An ability to review a subset of changes affecting the document is provided, where the changes in the subset affect particular segment(s) of the document.

25 Claims, 9 Drawing Sheets

|  1000 | 1002 | 1004 |
|---|---|---|
| Sports/Golf/Attributes Table | Accepted | 1/30/2005 13:02 |
| Sports/Baseball/Heading | Not Accepted | 3/18/2005 7:49 |
| Document/Header/Title | Accepted | 4/5/2005 22:38 |
| Sports/Golf/Attributes Table | Accepted | 5/22/2005 15:10 |

INTERACTIVE CONTROL OF DOCUMENT UPDATES

BACKGROUND OF THE INVENTION

During production of a document, updates to the document may be made. For example, segments of the document may be updated with new images, text content, data values, etc. The segments may be used to automatically generate the document. In some cases, a rendering engine may automatically generate a document and a graphics operator may adjust the layout using a layout application, for example to fine tune the layout in ways that provide a visual effect desired by the graphics operator. Many people may be involved in the document production process, and a number of producers may be responsible for producing document data. A person responsible for one or more aspects of the visual appearance of the document, such as a graphics operator, may desire control over the incorporation of changes into a document and/or visibility into how individual changes to text, graphics, data, etc. will affect the visual appearance of the document. Typically, changes made to images, text, or other data incorporated into a document, such as by automatically generating the document at least in part by incorporating such content from one or more data sources, have been incorporated into the document all at once, e.g., by regenerating the document or a portion thereof to cause the updated content to be incorporated. In some cases, a graphics operator may not have generated a change herself and may not be familiar with it, and in any event if the changes are numerous and/or the document large, it may be difficult and/or time consuming for the graphics operator to ensure that individual changes incorporated using such an approach have had an effect on the visual appearance of the document, such as may require an adjustment by the graphics operator to the layout, formatting, etc. of the document and/or its content. In some cases, it might be desirable to be able to permit some changes to be made and yet reject others, which also is difficult to do under the above approach. Improved control of updates to a document, and the ability to view how changes will affect the visual appearance of a document, would be useful.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Providing the ability to preview how individual changes to automatically generated portions of a document will affect the document, and in some embodiments to determine whether individual changes will be accepted, is disclosed. Changes to be applied to the document are presented. The document may be automatically generated using segments and in some embodiments a change references one of the segments used to automatically generate the document. A selected change is received, for example from a user via the same interface used to present changes to the user. In some embodiments, an instruction is received and a command is performed on the selected changes. For example, a selected change may be applied to the document. Recording information associated with a change to a document is also disclosed. A change to a document, where the document is generated using segments, is received. Information associated with the change is recorded such that the recorded information is accessible using the document. For example, the recorded information may be stored in a metadata format. In some embodiments, the recorded information is associated with an applied change where the change is with respect to a segment of the document. In some embodiments, recorded information includes changes that are not applied.

Figure 1:
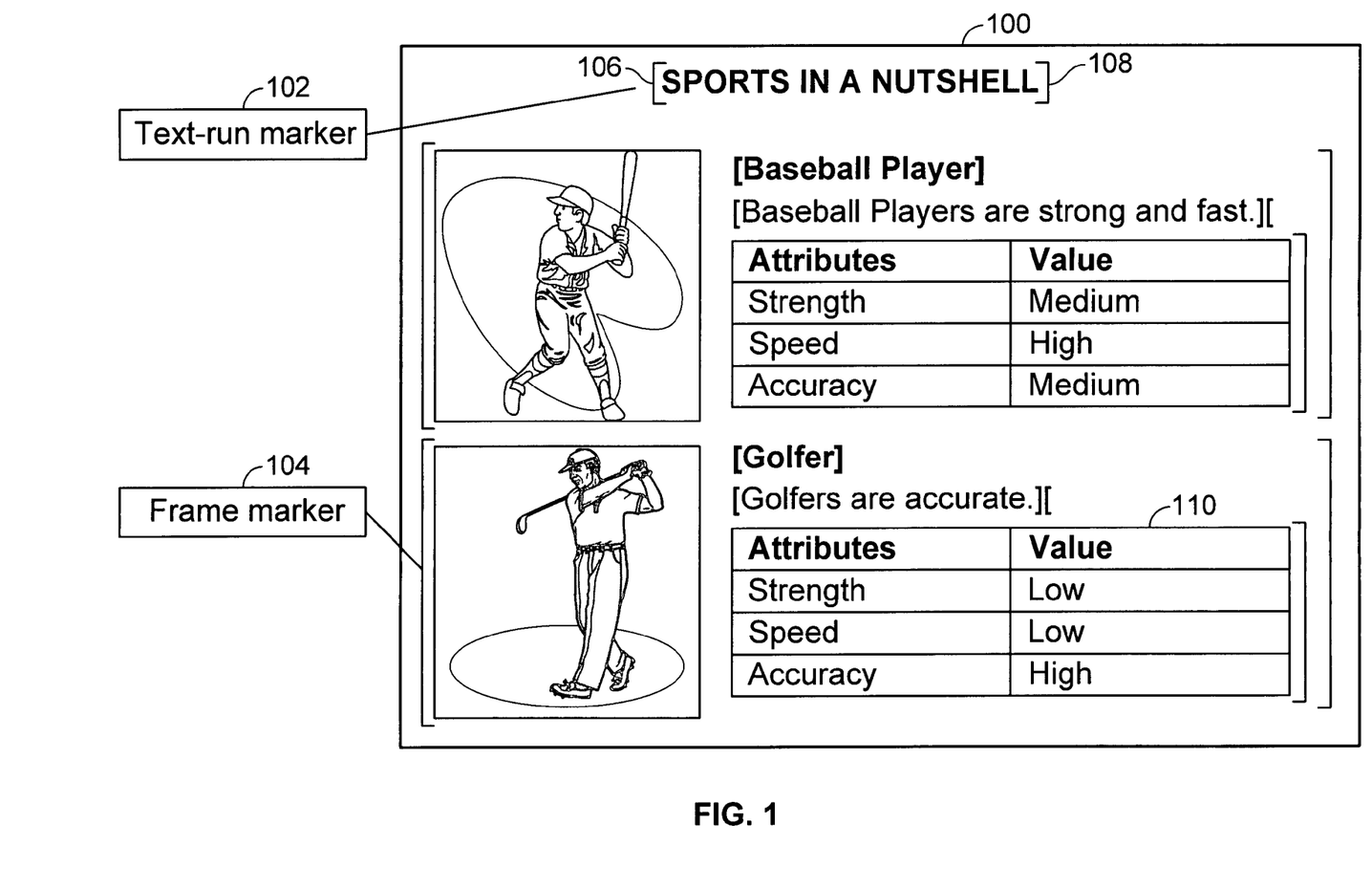
FIG. 1 is a diagram illustrating an embodiment of a document.

FIG. 1 is a diagram illustrating an embodiment of a document. In the example shown, each segment within document 100 is bounded by a beginning marker and an end marker. In some embodiments, a document may be a file, a template, or a form. Although in some embodiments a document is rendered and printed, a document in some embodiments is not associated with rendering and printing. Text run marker 102 is an example of such a segment and its boundaries are defined by beginning marker 106 and end marker 108. Beginning marker 106 and end marker 108 may be special characters not visible in the generated document as rendered and/or provided to an intended final recipient of the document, and/or not visible in at least certain views or modes. During the document production process, an application may illustrate beginning marker 106 and end marker 108 to a user responsible for the look and feel of the document. Segments may be used to automatically generate a document. The space between beginning marker 106 and end marker 108 is filled with text content. If new text content is created for a segment, the old text content is deleted and the new text content is used to fill in the segment. For example, in some embodiments the text displayed text run 102 is imported automatically from a data source associated with text run 102, such as by including an identifier, path, code snippet, and/or other content in an electronic tag or other data or metadata associated with the segment, which tag, etc. is usable by a graphics or other application used to generate the document to retrieve, e.g., upon receiving via a user interface a command to generate, regenerate, or update, the segment; upon receiving an indication that new data is available; etc. In some embodiments, once an initial version of the document has been generated, changes in associated data at their respective data source(s) are incorporated into associated segments upon generation or regeneration of the document or the portion of the document in which the segment is located. Frame marker 104 is another segment of document 100 and is similarly demarcated by beginning and end markers. Text and images are used to fill in frame marker 104. Other types of content (for example, graphics) may be used to fill a segment.

Segments may include other segments in a nested fashion. Table 110 is defined by beginning and end markers and is nested within frame marker 104. In some documents, a particular segment is instantiated more than once in a document. Changes to a segment may affect each instantiation of the segment within the document.

The illustrated segments are used to automatically generate a document. In some embodiments, a template defines the segments of a document and/or one or more attributes thereof. The nesting, sequence or placement of segments within a document are described by a template in some embodiments. Beginning and end markers for a segment are included in a template in some embodiments, but the space between beginning and end markers is not necessarily filled in with content. To automatically generate a document, a copy of the template is created. Using the copy, segments are filled in with related content. In the example shown, the text "SPORTS IN A NUTSHELL" is used to fill in the segment demarcated by beginning marker 106 and end marker 108. In some embodiments, formatting is applied, or may at the option of a creator of a template and/or document be applied, to content imported into a segment from a data source. Examples of formatting include font selection, font size, image cropping, shading, and other effects. In some embodiments, new content markers are created or inserted into the document based on the data structure or data content during generation of the document. In this example, a set of content markers may be generated for each sport included in the data file.

In some embodiments, a user adjusts a document after it is automatically generated. For example, images may be cropped or centered. The placement of a segment containing the title or other text may be adjusted within a page. Adjustments to the document after being automatically generated may vary from a brief visual inspection to significant user adjustment. In some cases, a document's look and feel are important. The document may be a consumer catalogue where the document owner desires a visually appealing document. In some cases, the aesthetics of the document are not as important as other factors, such as content accuracy, document production costs, or document production time, and in some such cases only minimal user adjustment is performed.

During the document production cycle, a change with respect to one or more of the segments may occur. New content may be created to replace old content in the automatically generated document. For example, "SPORTS IN A NUTSHELL" may change to "ATHLETIC CHARACTERISTICS BY SPORT."

Providing information regarding and/or control over individual changes to a document generated at least in part by importing one or more segments from associated data sources is disclosed. In some embodiments, an interface is used to present changes to be applied to a document. An indication that changes are to be reviewed may be received. The indication may be generated based on an action of a user. For example, a user selecting a review changes button may trigger an indication to be generated. In some embodiments, an application automatically generates an indication. Changes since the last round of changes were incorporated are obtained and determined by the interface. For example, a graphics operator may periodically review and apply changes, and changes created during the most recent period are collected by the interface. In some cases, a change is created during a previous period and is reviewed by a graphics operator but is not applied to the document. In various embodiments, all changes not yet applied, only changes created during the last period, and/or changes that the user has directed the interface to obtain are collected by the interface and presented to the user. Changes presented to a user may be automatically determined by the interface, manually controlled by a user, or some combination of the two methods.

Using such an interface, a user may select a subset of changes including an individual change and/or groups of changes (e.g., changes affecting the segments comprising a particular page and/or a higher level segment that incorporates other segments) and review the subset of changes. A user may select a single change or multiple changes to work with. If more precise understanding of a particular change or control over incorporation into a document is desired, a single change may be selected. Reviewing a subset of changes may include determining segments of a document affected by a change, viewing the current state of a segment, viewing formatting instructions associated with a change, seeing a preview of how the change would affect the document, and/or applying or rejecting the change to the document. In some embodiments, reviewing a document may be in the context of the document or a portion of the document. For example, if a change to a document affects part of a page, the change may be presented in the context of the affected page.

A record related to changes is passed with the document in some embodiments to facilitate management of the document. For example, many people may be involved in the document production process. During the document production cycle, a variety of users may desire knowledge of changes relating to a document and a record associated with the document may be useful. If the document is passed to other applications or users or the format of the document changes, in some embodiments the record also is transferred. Although such recorded information may be part of the document, in some embodiments the recorded information is not visible in the rendered document. An application may be used to access the information recorded. In some embodiments, a metadata language or format is used to store the recorded information. A variety of applications that understand the metadata language or format may be used to access the record.

Some examples of information that may be recorded include the name of a change that is applied to a document, the time and date at which a change is applied, the identity of the user who created a change, and the identity of the user who applied a change to a document. In some embodiments, changes that are created but not applied to a document are recorded.

The Extensible Metadata Platform (XMP) is one example of how updated related information may be stored. A variety of applications, file formats, and devices may be capable of accessing the metadata stored using XMP. Even if a document changes formats or different applications are used to edit a document, information about changes may be accessed by XMP compatible applications and devices. In various embodiments, other metadata formats or technologies besides XMP may be used to record change related information.

Figure 2:
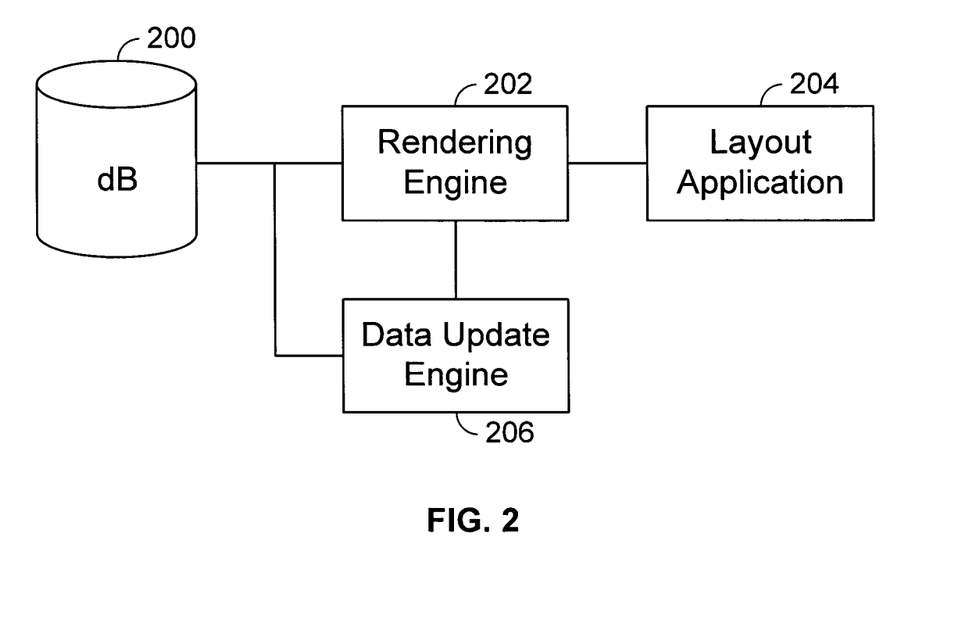
FIG. 2 illustrates an example of a system for incorporating a change into a document.

FIG. 2 illustrates an example of a system for incorporating a change into a document. In the example shown, data used to generate the document is stored in database 200. A template that describes segments of a document may be stored in database 200. Content used to fill in the segments are also stored in database 200. Formatting instructions applied to the content may also be stored in database 200. The data used to generate the document (template, content, and formatting instructions) may be stored in one or more files in database 200.

Rendering engine 202 automatically generates a document using document data stored in database 200. In some embodiments, rendering engine 202 retrieves document data from database 200 and fills in segments of the document with corresponding content. Formatting instructions may be used by rendering engine 202 to automatically generate a document. For example, an XML document may be used by rendering engine 202 to automatically generate a document. The automatically generated document is passed from rendering engine 202 to layout application 204. Some examples of rendering engine 202 include Adobe InDesign, Adobe Document Server, Adobe FrameMaker, and Quark Dynamic Document Server.

Using layout application 204, a user may adjust the document. For example, manual adjustments performed by a layout professional may be applied to the document. Layout application 204 may output a version of the document that includes such user adjustments. The document generated by layout application 204 may be in a variety of formats, such as in portable document format (PDF). Layout application 204 may be Adobe InDesign, Adobe Illustrator, Adobe FrameMaker, Adobe Photoshop, Macromedia FreeHand, Microsoft Word, or Microsoft PowerPoint.

As changes to document data are created, data update engine 206 provides an interface for the user to interact with the changes. Via the interface, data update engine 206 collects change related information and presents the information to a user. The user returns a selection of changes and interacts with the selected changes through the interface. If a change is applied to a document, data update engine 206 passes information corresponding to the change to rendering engine 202 which automatically generates the document including the applied change. The information passed to rendering engine 202 may only correspond to segments of the document affected by an incorporated change. In some embodiments, the entire document is regenerated and passed to the rendering engine, including portions of the document not affected by an applied change. The information passed to rendering engine 202 may be in a variety of formats, including instructions or code snippets rendering engine 202 is capable of interpreting. In some embodiments, a rendered image is passed from data update engine 206 to rendering engine 202.

Rendering engine 202, layout application 204, and data update engine 206 may be implemented in a variety of ways besides those described. In some embodiments, information associated with an applied change is passed from data update engine 206 to layout application 204 instead of rendering engine 202. Interfaces may be designed based on existing interfaces, the complexity associated with a particular interface, a desired feature, or the effort required to modify existing devices. The format of data passed between modules may vary from those described. The scope of information exchanged may vary. For example, information may relate to portions of the document that have changed or may include portions of the document unaffected by an incorporated change. In some embodiments, the modules illustrated are included in a single application. A user may be able to use a single application during the entire document production cycle. In some embodiments, the modules are incorporated into multiple applications.

Figure 3:
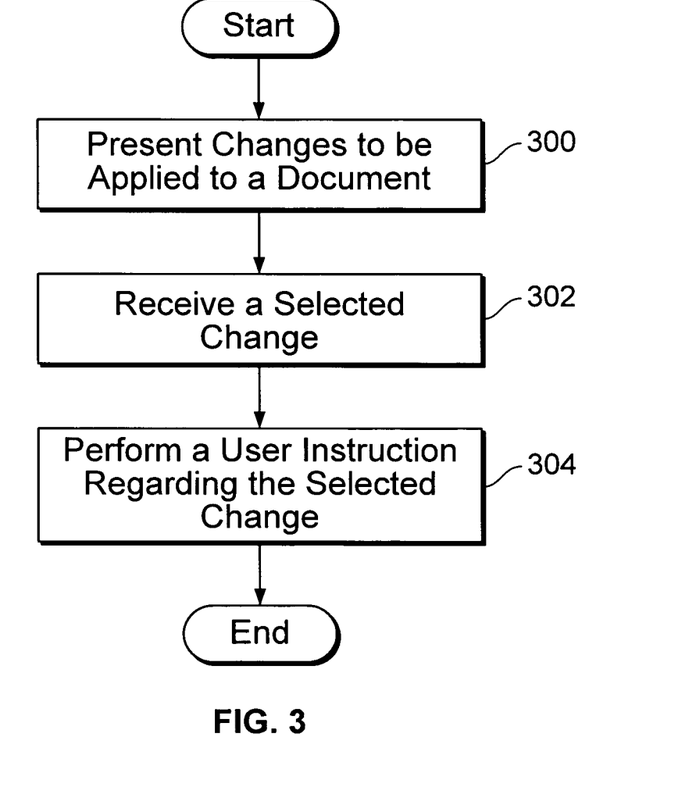
FIG. 3 is a flowchart illustrating an embodiment of a process for interacting with changes to a document.

FIG. 3 is a flowchart illustrating an embodiment of a process for interacting with changes to a document. In the example shown, changes to be applied to the document are presented at 300. A document may be automatically generated and a change may reference a segment used to automatically generate the document. Changes are presented to a user such that the user may select one or more changes from those presented. In some embodiments, changes are presented on a page by page basis. In some embodiments, changes for a particular portion of a document and/or page are viewed by selecting the portion of interest. Text or images may be used to represent each change to the user. For example, a name or description of the change may be presented to the user. An icon or a graphical representation of the change may be presented to the user. For example, a thumbnail sketch of a new image may represent a change that includes the new image. In some embodiments, changes are presented hierarchically. The hierarchy used to present the changes may be equivalent to a hierarchy within the document (such as the hierarchy of nested segments) or may be defined by the creator(s) of the change.

At 302, an indication that a particular change has been selected is received. In some embodiments, an interface is used to present changes to a user and receive selections from the user. Any appropriate selection technique may be used. For example, a user may use an input device (such as a stylus or a mouse) to select a change via the interface. A selected change may include a single change or multiple changes. In some embodiments, a user selects from choices presented hierarchically. A selection of a node in the hierarchy indicates the selection of changes associated with that node and all sub-nodes below that node in the hierarchy.

A user instruction regarding the selected change is performed at 304. A user instruction may be to apply the selected change. If the change is inserting new content in a segment, old content used to fill in the segment is deleted. The new content is obtained and formatting instructions may be combined with the obtained content. The combined content and formatting instructions are then used to fill in the segment. Other commands may be used to provide insight into a selected change before the change is applied. Another example of a user instruction available in some embodiments is an instruction to show which segments of the document would be affected by a change. A window displays the document with the beginning marker and end marker for each segment that would be affected by the change shown. Stale content between the beginning and end markers may be illustrated. The beginning and end markers or the stale content may be highlighted in a noticeable color or may have an effect (such as blinking, underlining, outlining, or bold type) to assist a user in identifying affected segments. A user may also preview the change. In some embodiments, the preview presents new content with formatting instructions applied. The preview in various embodiments includes formatting instructions, a script, or processing instructions used by an application to generate the document. In some embodiments, the user may undo a selected change. A selected change may be applied and undone any number of times.

The described interaction enables a user to have improved control over changes applied to a document. For example, a graphics operator may apply changes to a document one by one. After each change is applied, the graphics operator may examine the segments affected by a change. This may be useful in detecting erroneous changes (for example, a new image that should have been applied to a different segment) or an applied change that needs to be adjusted (for example, a new image that needs to be cropped or centered once incorporated into the document).

Figure 4:
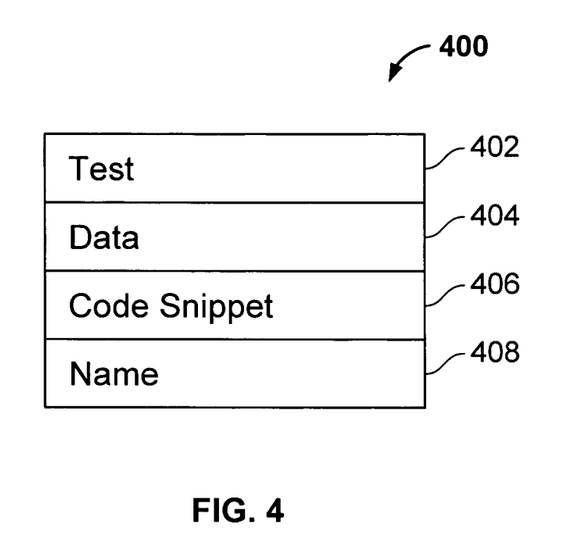
FIG. 4 is a diagram illustrating an embodiment of an update marker describing information associated with a change to a document.

FIG. 4 is a diagram illustrating an embodiment of an update marker describing information associated with a change to a document. In the example shown, update marker 400 is associated with a segment used to automatically generate a document. In this example, there is an update marker for each segment of a document. Update marker 400 is used to detect the presence of a change to a segment and regenerate the segment.

Test 402 is an expression used to detect the presence of a change to an associated segment. Test 402 is evaluated and a change is indicated by the evaluation. For example, if the evaluation is null, there is no change, but if the evaluation is not null then there is a change. A null evaluation may include evaluations that return an empty set or a null value. In some embodiments, different evaluations correspond to the presence of a change. For example, the sign of the evaluation (positive or negative), a Boolean value returned by the evaluation of the expression, or a zero/non-zero evaluation may be used.

In one example, test 402 is an XML Path (XPATH) expression. For example, the test XPATH may be "/top/updates [@type='attr-table' and @sport='golf']." The evaluation of this test XPATH may be used to detect the presence of a change to table 110. XPATH expressions reference the hierarchy of an Extensible Markup Language (XML) document and may be used to select and filter data in an XML document.

Data used to fill in a segment is targeted by data 404. The location of data for a particular segment, described by data 404, may remain the same even though the data stored at data 404 may change. In some embodiments, the location at which data is stored changes when data used to fill an associated segment changes.

Data 404 may be a data XPATH. An example data XPATH is "/top/sports/sport[@sport='golf']/attrs." A data XPATH targets data used to fill a segment by referencing the hierarchy of an XML document. The XML document may be used in the process of automatically generating a document. Data targeted by a data XPATH may be an image, text, graphics, or some combination of the above. The example data XPATH may be used to target data used to fill in table 100.

Update marker 400 includes code snippet 406. Formatting instructions are included in code snippet 406. Code snippet is applied to data targeted by data 404 to generate processing instructions. For example, data 404 may be used to retrieve data used to fill in a segment. A rendering engine may automatically generate the document using the segments. To apply a change to the rendered document, formatting instructions are passed to the rendering engine and the formatting instructions are obtained by applying code snippet 406 to data targeted by data 404.

In some embodiments, an XSL Transformation (XSLT) snippet is used for code snippet 406. XSLT is a language used to transform XML documents. To update table 110, in one embodiment an XSLT snippet is applied to an associated data XPATH and the resulting processing instructions are used to regenerate the segment.

Name 408 is the name of the change presented to a user. For example, a user interface may present changes to a user in the form of a list. Name 408 contains the name presented to the user in the list. Name 408 may include a description of new content, a description of the section of the document affected by the change, or a description of the when the change was created. A person who created a change may specify name 408 for that change. In some embodiments, name 408 is automatically generated.

In some embodiments, name 408 is hierarchical. The hierarchy of name 408 may be a hierarchy associated with automatically generating the document. For example, an XML document may be used to automatically generate a document and the hierarchy of name 408 may match the hierarchy of the XML document. It is not necessary, however, for a hierarchy of name 408 to match any other hierarchy. For example, a hierarchical name may describe a part of the document affected, such as "Sports/Golf/Attributes Table."

Presenting hierarchical choices to the user may enable a user to select all changes below a selected node in the hierarchy. For example, two golf changes may be presented to a user: a change to the attributes table for golfers and a change to the description of golfers. The changes are presented to a user in a hierarchical format. If the user selects the node corresponding to golf changes, the change to the attributes table and the change to the description are both selected.

Although this example illustrates a test expression and a data expression, in some embodiments, no test expression is used to determine if there is a change. In some embodiments, an update marker is only created where there is a change to be applied. If there is no change to a segment of a document, no update marker is created. In some embodiments, update markers without test expressions are created even for segments that have not changed. In some embodiments, it is determined based on evaluation of the data expression whether there is a change to a segment. A variety of methods and techniques besides those described may be used to convey information related to changes. For example, other languages and technologies besides XML, XPATH, and XSLT may be used. Structured Query Language (SQL) and JavaScript are some examples of other languages that may be used.

Figure 5:
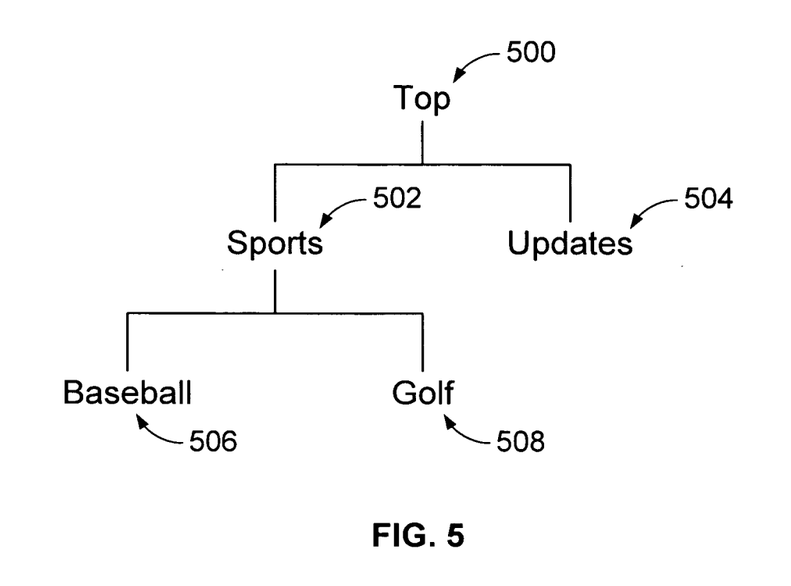
FIG. 5 is a chart illustrating an example of a hierarchy associated with a document.

FIG. 5 is a chart illustrating an example of a hierarchy associated with a document. In the example shown, the document is an XML document. Node 500 is the top level of the hierarchy and includes node 502 (sports) and node 504 (updates). In this example, the updates branch is associated with determining if there are changes to segments of an automatically generated document. A test XPATH may reference the updates branch. The sports branch is associated with data used to fill in segments of a document. A data XPATH may target data in the sports portion. Node 502 includes nodes 506 and 508, corresponding to baseball and golf, respectively. Golf data may be organized under node 508 and baseball data may be organized under node 508. Different hierarchies may be used. For example, there may be no updates node 504 if there is no test XPATH. There may also be no updates node if there is a test XPATH but the test path includes the "/top/sports" path.

Figure 6:
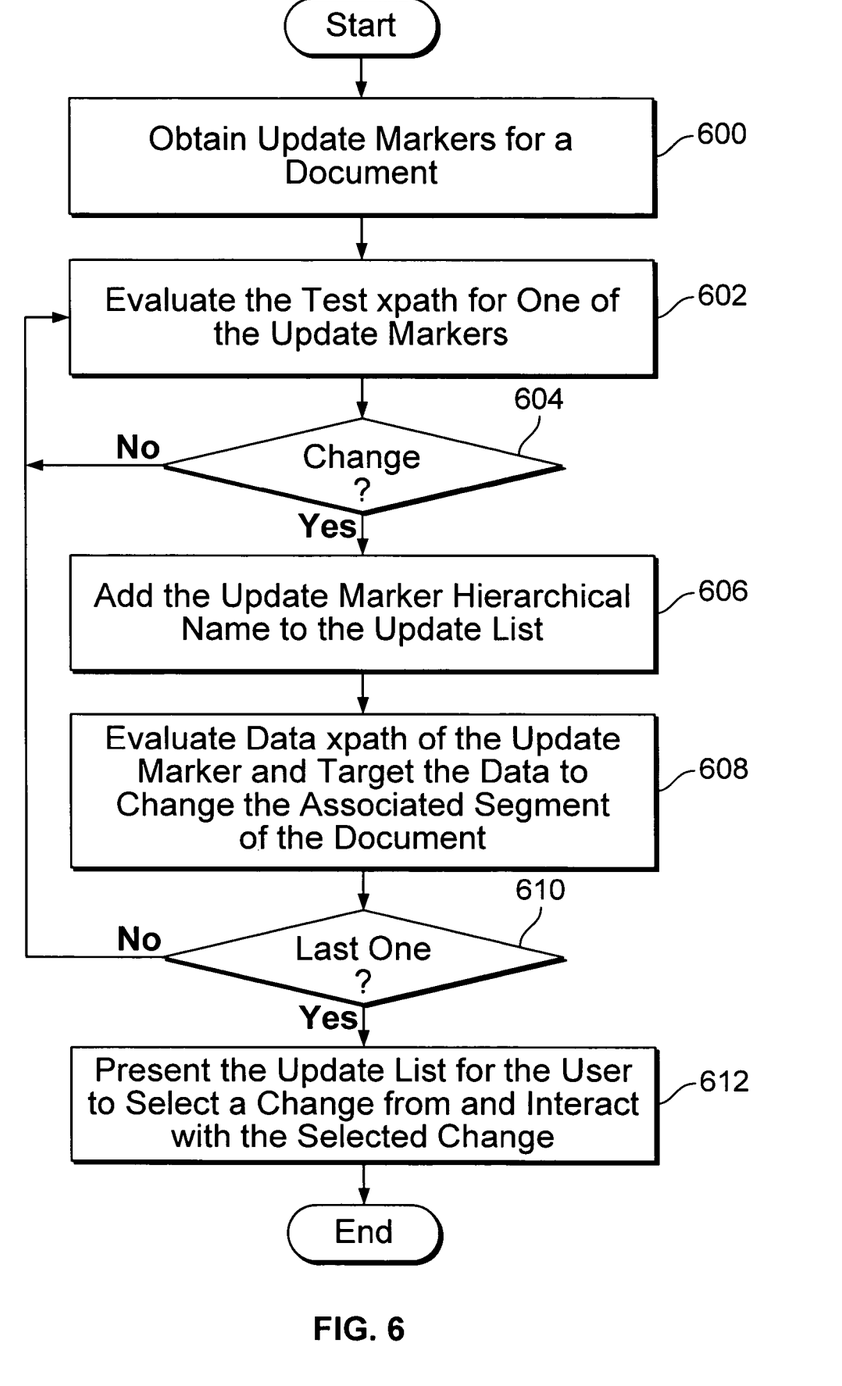
FIG. 6 is a flowchart illustrating an embodiment of a process for presenting changes to a user.

FIG. 6 is a flowchart illustrating an embodiment of a process for presenting changes to a user. In the example shown, update markers in the form of update marker 400 may be used to update segments of an automatically generated document. Update markers for the document are obtained at 600. In some embodiments, a user may specify the application file(s) containing update markers and command the application to open the specified files. Update makers in some embodiments are automatically obtained without user direction. Files in addition to those containing update markers may be obtained. For example, a separate file containing an XML document may be obtained. The update markers may reference portions of the hierarchy described by the XML document.

The test XPATH for one of the update markers is evaluated at 602. The evaluation of a test XPATH can be used to determine whether there is a change to be applied to an associated segment of the automatically generated document. The test XPATH may be an expression that references a hierarchy associated with an XML document. At 604 it is determined whether there is a change. If a change is indicated by the evaluation of the test XPATH, the update marker hierarchical name is added to the update list at 606. The update list may be a list of hierarchical names of changes to be applied to a document. If there is no change, the test XPATH for the next update marker is evaluated at 602.

The data XPATH of the update marker is evaluated and the data to change the associated segment of the document is targeted at 608. The path specified by the data XPATH references a hierarchy associated with an XML document. At 610 it is determined whether the update marker is the last one. If it is the last update marker, the update list is presented for the user to select a change from and interact with the selected change at 612. Otherwise, the test XPATH for the next update marker is evaluated at 602.

In some embodiments, the process is different from that described. In some embodiments, evaluating the data XPATH at 608 is not performed. The data XPATH is not evaluated until an apply instruction or a preview instruction is received.

Figure 7:
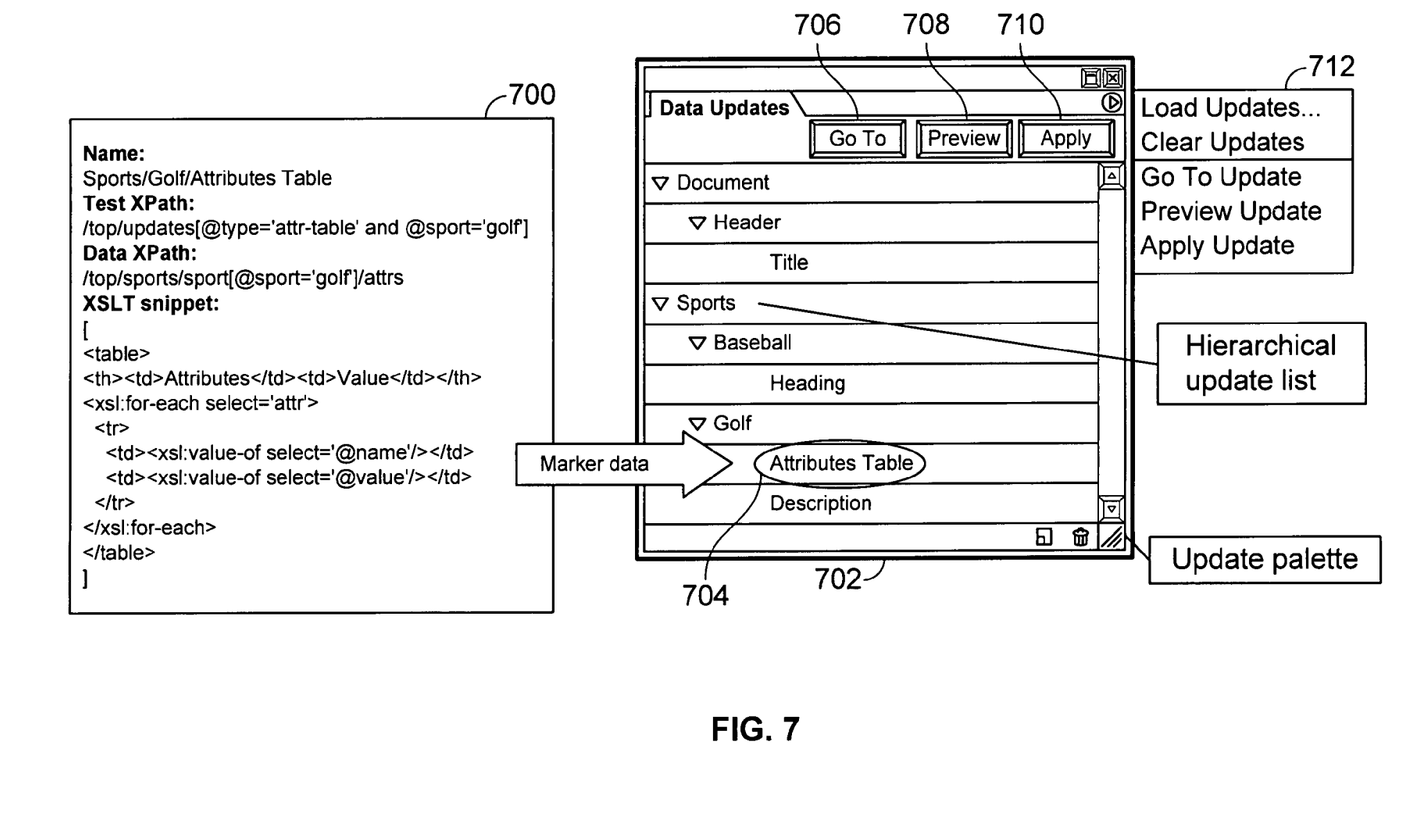
FIG. 7 is a diagram illustrating an embodiment of an interface for interacting with changes.

FIG. 7 is a diagram illustrating an embodiment of an interface for interacting with changes. In the example shown, update marker 700 is used to generate update palette 702. Other update markers in addition to update marker 700 are also used to generate update palette 702. Update marker 700 is associated with changing an attributes table for golfers. Update palette 702 includes a hierarchical update list of changes. Included in the hierarchical update list is change 704. The hierarchical name of change 704 matches the name given by update marker 700. Changing a name in an update marker correspondingly changes a name in the hierarchical update list.

Using the update palette, one or more changes may be selected by the user. The user may use an input device, such as a mouse, to select change 704 from update palette 702. In some embodiments, selecting the node "Sports" includes selection of "Sports/Baseball/Heading", "Sports/Golf/Attributes Table", and "Sports/Golf/Description".

User commands may be applied to selected changes via update palette 702. Go to button 706 illustrates segments of the document affected by a selected change. Another window in addition to update palette 702 may be presented to the user to illustrate affected segments. The affected segments may be illustrated in the context of the document. For example, an affected segment may be shown within a segment that includes the affected segment, or within a page that includes the affected segment. The beginning markers and end markers may be highlighted, blinking, in bold type or have some other effect to show affected segments or stale content. Characters such as parentheses, braces, brackets, or multi-character symbols may be used where beginning and end markers are placed in the document.

Preview button 708 may be used to preview a selected change. In some embodiments, the preview generated is not a rendering of the document after the selected change is applied. The preview may be instructions generated from applying the XSLT snippet to data targeted by the data XPATH. The instructions generated by preview button 708 may be the same instructions passed to a rendering engine. The rendering engine may use the instructions to generate a document with the change applied.

To apply a selected change to a document, apply button 710 may be used. In some embodiments, an undo instruction may be used to undo an applied change and an undo button may be added to update palette 702. Apply button 710 in some embodiments is coupled to other applications or displays. For example, a document may be generated by a rendering engine or a layout application. Selecting apply button 710 may trigger generation of a rendered document, and a view of the rendered document may be shown to the user. The apply button in some embodiments is coupled to recording change related information.

Commands may be available through pull down menu 712 of update palette 702. Commands available through buttons 706, 708, and 710 are also available using pull down menu 712. Pull down menu 712 also includes additional commands not available via a button. The load update instruction in pull down menu 712 is used to identify and load files containing update markers. Clear update is used to remove data associated with an update from update palette 702. In some embodiments, the clear update command is coupled to recording change related data. As changes are applied, data associated with applying the change is stored. For example, the hierarchical name of the change, the date and time the change is applied, and the user who applied the change may be stored. The clear update instruction may trigger this stored data to be recorded in the document. In some embodiments, changes that are not applied are also recorded.

Figure 8:
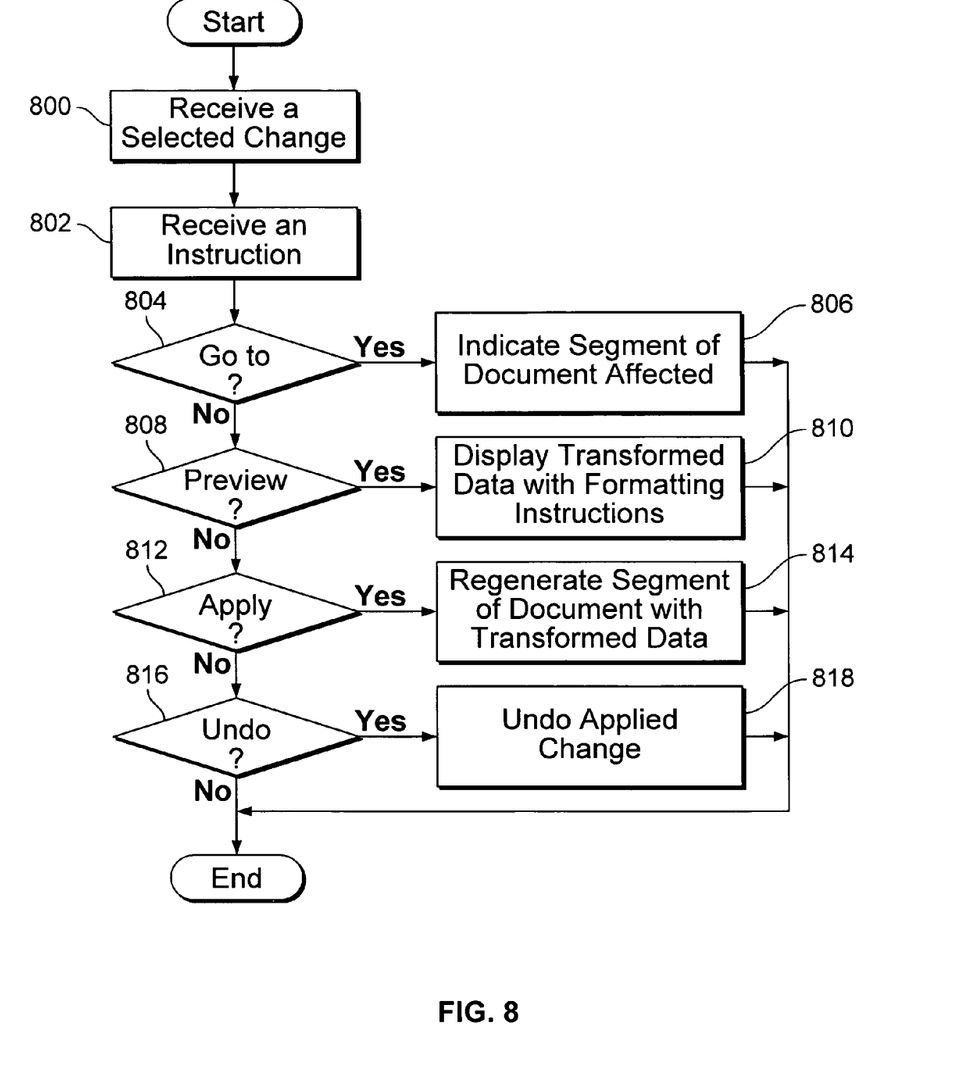
FIG. 8 is a flowchart illustrating an embodiment of applying an instruction to a selected change.

FIG. 8 is a flowchart illustrating an embodiment of applying an instruction to a selected change. In the example shown, a user may go to, preview, apply or undo a selected change. A selected change is received at 800. In some embodiments, more than one change may be selected. The selected change may be received through a common interface used to present changes, receive selections from the presented changes, and/or receive commands. An instruction is received at 802. At 804, it is determined whether it is a go to instruction. If it is, a segment affected is indicated at 806. If the instruction is not a go to instruction, at 808 it is determined whether the instruction is a preview. If it is a preview instruction, transformed data with formatting instructions is displayed at 810. A code snippet may be applied to data targeted by a data expression to generate the transformed data with formatting instructions. If the instruction is not a preview, the process determines at 812 whether the instruction is an apply instruction. If it is, a segment of the document is regenerated with transformed data. If it is not an apply instruction, at 816 a decision is made whether it is an undo instruction. If it is an undo instruction, the applied change is undone.

The process may be repeated a number of times by the user as the user selects and interacts with changes. For example, the user may select and interact with changes one by one.

After working with the presented changes, the user may unload changes (for example, using an unload updates instruction from a pull down menu) or close the interface. In some embodiments, unloading the changes or closing the interface are coupled to recording information associated with changes.

Figure 9:
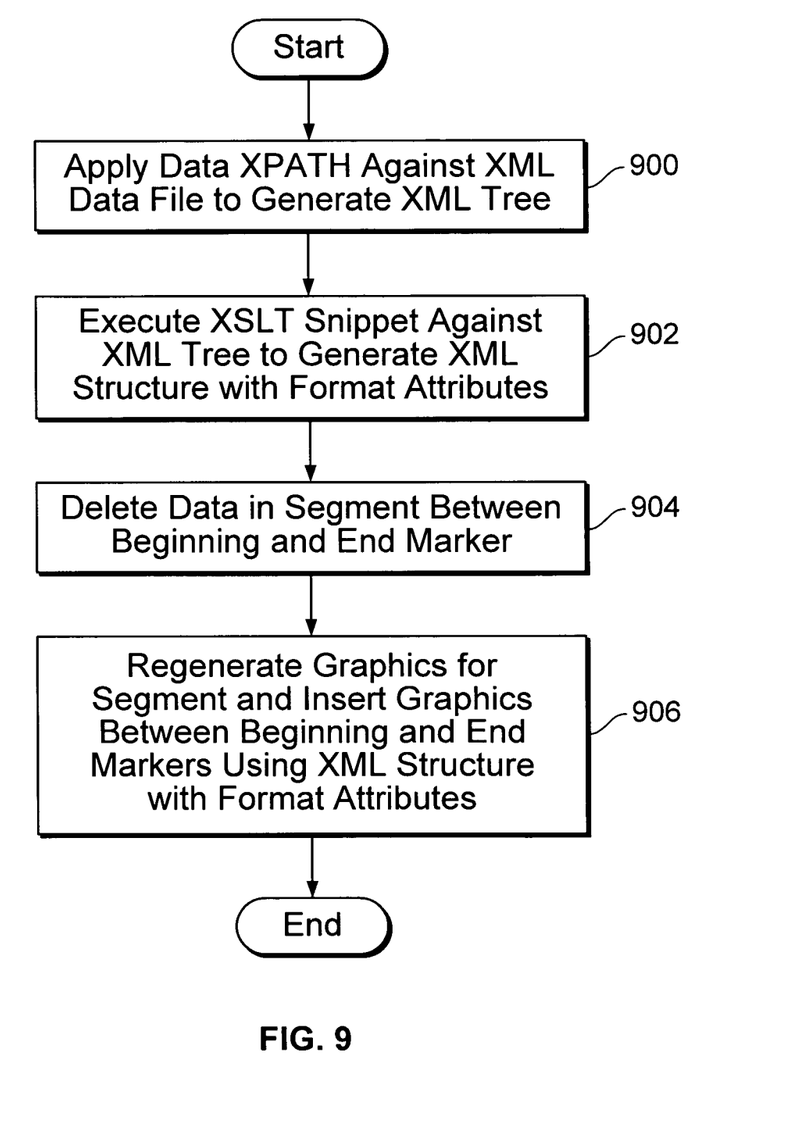
FIG. 9 is a flowchart illustrating an embodiment of applying a change to a document.

FIG. 9 is a flowchart illustrating an embodiment of applying a change to a document. In the example shown, XML and XML related languages are used to apply a change to a document. At 900, a data XPATH is applied against an XML data file to generate an XML tree. For example, the data XPATH may target content by referring to a hierarchy. The hierarchy referred to by the data XPATH may be associated with the XML data file, and the generated XML tree may include content.

An XSLT snippet is executed against an XML tree to generate an XML structure with format attributes at 902. The generated XML structure may be used by a document application to regenerate the document. For example, Adobe InDesign may use the XML structure with format attributes to modify the document according to the change information. In some embodiments, the XSLT snippet transforms input data into a format that inDesign (or another application) is capable of processing.

Data in a segment between the beginning and end marker is deleted at 904. Using the XML structure with format attributes, graphics for a segment are regenerated and inserted between beginning and end markers at 906.

Figure 10:
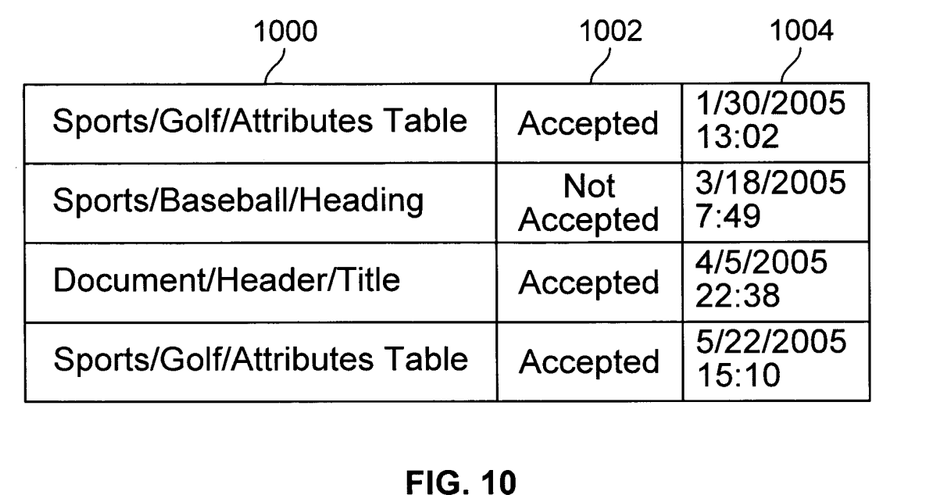
FIG. 10 is a table illustrating an embodiment of change related information recorded.

FIG. 10 is a table illustrating an embodiment of change related information recorded. In the example shown, the change related information may be part of the document. Column 1000 includes names used to identify the changes. In this example, the names are hierarchical names presented to a user who accepts or does not accept a change. In some embodiments, the name recorded reflects the scope of hierarchical changes selected by a user. For example, a user may select node Sports/Golf (and thus select all changes in the Sports/Golf path) and incorporate the changes into the document. The name recorded in column 1000 may use Sports/Golf or may explicitly describe each change incorporated within the Sports/Golf path.

In some embodiments, a name is not used as an identifier. For example, an alphanumeric identifier (for example, b2d90i) may be used to identify the changes. In some embodiments, each identifier is unique, even if two identifiers are associated with the same segment of a document. In some embodiments, each identifier is unique with respect to identifiers for other segments. Two changes to the same segment but corresponding to different updates (for example, one change uses image A and the other change uses image B) may use the same identifier, whereas the identifier for another segment is different. In some embodiments, the identifier used is not the same identifier presented to a user. For example, a hierarchical name presented to a user may use a larger number of ASCII characters, and the identifier recorded with the document may be shorter to reduce the size of the document.

Column 1002 corresponds to the status of each change. In the example shown, two states are used to describe status: accepted and not accepted. An accepted change is incorporated into the document. In some embodiments, other states may be used to describe the status of changes with respect to a document. For example, a user may be able to undo a document. States used to describe changes may be: accepted, not accepted, and undone. In some embodiments, the recorded information will include two entries for a change that is undone. One entry corresponding to accepting the change, and one entry corresponding to undoing the change. Other states such as previewed and rejected may be used. A specific interaction by a user may be associated with each state. For example, for a change to be rejected, a user may select the change and use a reject instruction to indicate the change is rejected. The content may be incorrect or incorporating the change may disrupt the integrity of the document. For the status of a change to be previewed, the user may select the change and push preview button 708.

Timestamps are recorded in column 1004. The day and time at which a change is accepted are included. The day and time at which a change is accepted may correspond to the time at which an accept instruction is issued by a user. The timestamp for a change that is not accepted may reflect the time at which an interface used to select and interact with changes is closed by a user. For example, the time at which update palette 702 is closed or changes are unloaded may be used as the timestamp for changes that are not accepted.

Other embodiments use additional or alternative recorded information besides the information illustrated in this embodiment. For example, the identity of a user associated with a change may be recorded. With this information recorded, it may be determined which user is responsible for incorporating a given change into a document. Application related information may also be recorded. For example, a variety of applications may be used to access the document. The name of the application (or some other identifier) of the application may be recorded. Information generated by a user may be recorded. For example, a content producer may record a comment about the change to assist other users. The comment may say "New logo" or "Adjusted shading per client's instructions." Other users besides content producers may also generate information to be recorded. A user who reviewed a change but did not incorporate it into a document may generate a comment of "Incorrect price used" to be recorded Recorded change related information may be incorporated in the document so that the information travels with the document as the document is passed from user to user or application to application. A project manager or other user may review the recorded information to determine changes incorporated into a document. In some embodiments, processing of the recorded information is performed by an application. For example, as new or updated content is created by content producers, changes corresponding to the new or updated content are documented. An application may cross reference the changes created by content producers with the recorded information with a document to confirm that changes are incorporated. A log summarizing the results of the cross reference may be generated for review by a user.

Figure 11:
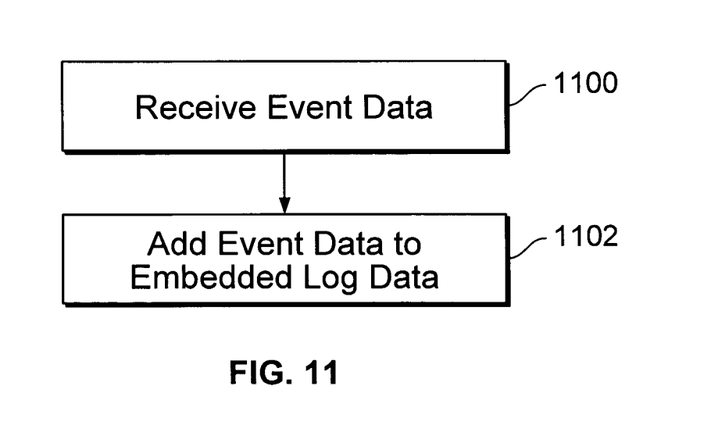
FIG. 11 is a flowchart illustrating an embodiment of recording change related information with a document.

FIG. 11 is a flowchart illustrating an embodiment of recording change related information with a document. In the example shown, changes are selected and interacted with by a user. A user may select and incorporate all changes at one time into a document, or may select and incorporate changes one by one. Other interactions besides incorporating a change into a document may be performed on the selected changes.

Event data is received at 100. Event data is associated with a change to a segment of a document. Event data may include a name, a status, and a timestamp, as are illustrated in columns 1000, 1002, and 1004. At 1102, event data is added to embedded log data. In some embodiments, event data associated with multiple changes are added to the embedded log data at the same time. For example, when the user closes an interface, all event data generated during the user's interaction with the interface is added. In some embodiments, event data is added to embedded log data as event data is received. For example, if a user applies a change to a document, associated event data is received and added to the embedded log data. Subsequent event data is added to the embedded log data when received.

In some embodiments, the process described is performed by the same application that provides the interface for a user to interact with selected changes. In some embodiments, a separate entity receives and adds the event data to the embedded log data. For example, the application that provides the interface may not support the metadata format used to add event data to the embedded log data. Another entity that supports the metadata format may perform the process described above. In some embodiments, the event data received is processed before being added to embedded log data. For example, received event data may be transformed, augmented, reduced, reformatted, reorganized, etc. Such processing may be used to format the received event data into a format appropriate for the application.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer program product, the computer program product being embodied in a non-transitory computer readable medium and comprising computer instructions for:
   receiving a document comprising one or more segments, wherein each segment has a position within a hierarchy of the document and is configured to be generated automatically based at least in part on data from a data source associated with that segment;
   receiving a plurality of visual changes, which includes one or more visual graphical changes and/or one or more visual textual changes, to be applied to the document or a portion thereof and created by a first entity;
   prior to applying the received plurality of changes, presenting to a second entity the plurality of changes to be applied to the document, including by displaying only those portions of the hierarchy of the document that would be affected by the plurality of changes if the plurality of changes were applied to the document;
   receiving from the second entity a selection of one or more of the presented plurality of visual changes to be applied; and displaying the document with the selected changes applied in response to receiving from the second entity the selection of one or more of the presented plurality of changes to be applied.

2. A computer program product as recited in claim 1, wherein displaying includes using a visual effect to point out the portions of the document affected by the plurality of changes if the plurality of changes were applied to the document.

3. A computer program product as recited in claim 1, wherein presenting includes displaying a processing instruction used to process the data from a data source.

4. A computer program product as recited in claim 1, the computer program product further comprising computer instructions for determining that there is a change to the document or a portion thereof.

5. A computer program product as recited in claim 1, the computer program product further comprising computer instructions for determining that there is a change to the document or a portion thereof using an XPATH statement.

6. A computer program product as recited in claim 1, wherein a data expression is used to identify the data from the data source associated with the segment.

7. A computer program product as recited in claim 1, wherein a data expression is used to identify the data from a data source associated with the segment, and the data expression includes an XPATH statement.

8. A computer program product as recited in claim 1, wherein a processing instruction is used to process the data from a data source associated with the segment.

9. A computer program product as recited in claim 1, wherein a processing instruction is used to process the data from a data source associated with the segment, and the processing instruction includes XSLT.

10. A computer program product as recited in claim 1, the computer program product further comprising computer instructions for collecting information to be recorded associated with the subset of changes affecting the document, such that the recorded information is accessible using the document.

11. A computer program product as recited in claim 1, the computer program product further comprising computer instructions for collecting information to be recorded associated with the subset of changes affecting the document, such that the recorded information is accessible using the document, wherein the recorded information includes a timestamp.

12. A computer program product as recited in claim 1, wherein: the received plurality of changes includes an update marker that (1) is associated with at least one of the segments in the document and (2) includes a test expression; and the computer program product further comprises computer instructions for evaluating the test expression included in the update marker and determining whether there is a change to the segment associated with the update marker based at least in part on the evaluation of the test expression.

13. A computer program product as recited in claim 1, wherein the computer instructions displaying only those portions, of the hierarchy of the document that would be affected by the plurality of changes if the plurality of changes were applied to the document include using an indented list, wherein the indentations in the indented list reflect levels of hierarchy.

14. A computer program product as recited in claim 13 further comprising computer instructions for: displaying, in a same window as the displayed indented list, a graphical user interface (GUI) control associated with previewing; and in response to the second entity activating the GUI control associated with previewing:
   generating one or more instructions by applying (1) an XSLT snippet associated with a selected portion of the hierarchy selected from the indented list to (2) data targeted by a data XPATH, wherein the generated instructions are the same instructions that would be passed to a rendering engine if those instructions were to be applied; and
   displaying to the second entity the generated instructions.

15. A computer program product as recited in claim 1 further comprising computer instructions for: receiving from the second entity a second selection of one or more changes, applied to the document by the second entity, which are to be undone; and displaying the document with the selected changes undone in response to receiving from the second entity the second selection of changes.

16. A system, including: a processor; and a memory having instructions stored thereon, that, when executed by the processor, causes the processor to perform operations comprising:
   receiving a document comprising one or more segments, wherein each segment has a position within a hierarchy of the document and is configured to be generated automatically based at least in part on data from a data source associated with that segment;

receiving a plurality of visual changes, which includes one or more visual graphical changes and/or one or more visual textual changes, to be applied to the document or a portion thereof and created by a first entity;

prior to applying the received plurality of changes, presenting to a second entity the plurality of changes to be applied to the document, including by displaying only those portions of the hierarchy of the document that would be affected by the plurality of changes if the plurality of changes were applied to the document;

receiving from the second entity a selection of one or more of the presented plurality of visual changes to be applied; and displaying the document with the selected changes applied in response to receiving from the second entity the selection of one or more of the presented plurality of changes to be applied.

17. A system as recited in claim 16, wherein: the received plurality of changes includes an update market that (1) is associated with at least one of the segments in the document and (2) includes a test expression; and the processor is further configured to evaluate the test expression included in the update marker and determine whether there is a change to the segment associated with the update marker based at least in part on the evaluation of the test expression.

18. A system as recited in claim 16, wherein the processor is configured to displaying only those portions of the hierarchy of the document that would be affected by the plurality of changes if the plurality of changes were applied to the document by using an indented list, wherein the indentations in the indented list reflect levels of hierarchy.

19. A system as recited in claim 18, wherein the processor is further configured to: display, in a same window as the displayed indented list, a graphical user interface (GUI) control associated with previewing; and in response to the second entity activating the GUI control associated with previewing:
generate one or more instructions by applying (1) an XSLT snippet associated with a selected portion of the hierarchy selected from the indented list to (2) data targeted by a data XPATH, wherein the generated instructions are the same instructions that would be passed to a rendering engine if those instructions were to be applied; and
display to the second entity the generated instructions.

20. A system as recited in claim 16, wherein the processor is further configured to: receive from the second entity a second selection of one or more changes, applied to the document by the second entity, which are to be undone; and display the document with the selected changes undone in response to receiving from the second entity the second selection of changes.

21. A method, including:
receiving a document comprising one or more segments at a processor, wherein each segment has a position within a hierarchy of the document and is configured to be generated automatically based at least in part on data from a data source associated with that segment;

receiving a plurality of visual changes, which includes one or more visual graphical changes and/or one or more visual textual changes, at the processor to be applied to the document or a portion thereof and created by a first entity;

prior to applying the received plurality of changes, presenting to a second entity the plurality of changes to be applied to the document using the processor, including by displaying only those portions of the hierarchy of the document that would be affected by the plurality of changes if the plurality of changes were applied to the document;

receiving from the second entity, at the processor, a selection of one or more of the presented plurality of visual changes to be applied; and displaying the document with the selected changes applied in response to receiving from the second entity the selection of one or more of the presented plurality of changes to be applied using the processor.

22. A method as recited in claim 21, wherein: the received plurality of changes includes an update marker that (1) is associated with at least one of the segments in the document and (2) includes a test expression; and the method further includes evaluating the test expression included in the update marker and determining whether there is a change to the segment associated with the update marker based at least in part on the evaluation of the test expression.

23. A method as recited in claim 21, wherein displaying only those portions of the hierarchy of the document that would be affected by the plurality of changes if the plurality of changes were applied to the document includes using an indented list, wherein the indentations in the indented list reflect levels of hierarchy.

24. A method as recited in claim 23 further comprising: displaying, in a same window as the displayed indented list, a graphical user interface (GUI) control associated with previewing; and in response to the second entity activating the GUI control associated with previewing:
generating one or more instructions by applying (1) an XSLT snippet associated with a selected portion of the hierarchy selected from the indented list to (2) data targeted by a data XPATH, wherein the generated instructions are the same instructions that would be passed to a rendering engine if those instructions were to be applied; and
displaying to the second entity the generated instructions.

25. A method as recited in claim 21 further comprising: receiving from the second entity a second selection of one or more changes, applied to the document by the second entity, which are to be undone; and
displaying the document with the selected changes undone in response to receiving from the second entity the second selection of changes.

* * * * *